United States Patent [19]

Persson

[11] Patent Number: 4,524,909
[45] Date of Patent: Jun. 25, 1985

[54] APPARATUS FOR PRODUCTION OF HOT TAP WATER

[76] Inventor: Ingemar Persson, Tallvägen 3, S-562 02 Taberg, Sweden

[21] Appl. No.: 551,042

[22] Filed: Nov. 14, 1983

[30] Foreign Application Priority Data

Nov. 15, 1982 [SE] Sweden ................. 8206471

[51] Int. Cl.³ ............................. G05D 23/00
[52] U.S. Cl. .................... 237/2 B; 62/238.6
[58] Field of Search ............ 237/2 B; 126/427; 62/238.6, 324.1

[56] References Cited

U.S. PATENT DOCUMENTS 4,235,369 11/1980 Huber ................. 62/238.6

FOREIGN PATENT DOCUMENTS 3044684 7/1982 Fed. Rep. of Germany ...... 126/427

Primary Examiner—Henry Bennett
Attorney, Agent, or Firm—James E. Nilles; James R. Custin

[57] ABSTRACT

Compressed refrigerant from a heat pump compressor flows through a first of three heat exchanger passages that are in mutual heat transfer relationship. Radiator water from a reservoir flows through a second of those passages and back to the reservoir in a heat exchange circuit. A radiator circuit that has at least one radiator is connected with the reservoir in parallel with the heat exchange circuit. Through the third passage a source of unheated tap water is communicated with a tap system from which heated tap water can be drawn, flow through that third passage being counter to refrigerant flow in the first passage. In the heat exchange circuit radiator water can be pumped through the second passage counter to refrigerant flow to be heated or counter to tap water flow for tap water heating. A separate pump in the radiator circuit circulates radiator water through it as needed to meet heat demands at the radiator. For supplemental heating another heat source can operate in a third radiator water circuit that is connected with the reservoir in parallel with the heat exchange circuit and the radiator circuit.

4 Claims, 4 Drawing Figures

APPARATUS FOR PRODUCTION OF HOT TAP WATER

The present invention relates to an apparatus for producing hot tap water in a heating plant which also provides hot water for a radiator system and which has a reservoir for heated radiator water and at least one but preferably two heat sources, one of which can be a heat pump and the other a conventional heat source such as an oil fired boiler; and the invention is more particularly concerned with apparatus of that type which is capable of providing hot tap water whenever it is demanded, in the quantities demanded, but which nevertheless requires little or no capacity for storage of hot tap water.

The consumption of hot tap water on a premises varies strongly over the course of time, with marked stoppages of consumption at certain times and possible high demand at other times. If the heating plant that provides the premises with hot tap water and other heat comprises an intermittently operating heat source, then the plant must have a capability for storage of a substantial amount of heat energy in some form, in order for hot tap water to be assuredly available in the required quantities at times when there is a demand for it. The situation is such that a reduction of storage capacity quickly brings about an increasing demand upon the available heating capability in order that the hot tap water shall assuredly be sufficient. Thus, if capacity for storage of hot tap water is completely eliminated, the available heating capability must be dimensioned for the maximum hot tap water withdrawal, which often implies an overdimensioning by a factor of ten or more in relation to heating capability required for the average rate of withdrawal.

According to heretofore conventional practice, hot tap water has been stored in a tank under full system pressure, and often at a temperature so high that it must be mixed with cold water before it can be used. By reason of this high temperature, it has been possible to store enough energy in a storage tank of relatively limited size to ensure adequate availability of hot tap water.

If, however, there is not a sufficiently high temperature in the heating apparatus—on the order of 80° to 90° C.—the volume of the reservoir for hot tap water must be markedly increased, as can be the case, for example, with heating plants that collect heat from a heat pump at a slow rate and during a long period of time, inasmuch as a heat pump usually cannot operate with a temperature higher than about 55°.

Since storage of new water imposes large demands upon corrosion resistance of the employed storage vessel, and since, in addition, the vessel is under full system pressure, it is obvious that every increase in volume of a hot tap water reservoir entails significant costs.

In a large heating plant there is as a rule a reservoir tank for storage of heated radiator water. Because radiator water is circulated in a closed system, and soon loses its oxygen content during operation of the apparatus, it can be regarded as relatively free from materials that promote corrosion, and therefore it does not pose any great requirement for corrosion resistance in the reservoir. Further, a reservoir tank for radiator water need not be able to withstand any large overpressure, and in view of this, too, that tank is able to store a large quantity of water at relatively low cost. Against this background, the present invention is based on the recognition that a reservoir filled with hot radiator water is a desirable source of heat for tap water heating.

In German published patent application No. 2,405,076 there is disclosed a heating apparatus that comprises an electrically heated reservoir for radiator water, which reservoir is connected to a radiator circuit, for heating it, by way of a duct system with a shunt valve. The heating apparatus further has a solid fuel boiler that is parallel coupled with the reservoir and which, when the reservoir is cool, can give off heat both to the reservoir and to the radiator circuit. In that disclosed heating apparatus, however, no consideration has been given to the production of hot tap water, and therefore the apparatus is not suitable for that purpose.

German Pat. No. 2,558,511 discloses heating apparatus designed both for producing hot tap water and for radiator heating. It comprises a heat pump coupled in series with an electric heating device, and the radiator water flows therein as a heat carrier. The apparatus further comprises a radiator water reservoir, a radiator circuit, and a hot tap water producer comprising a storage tank and a heat exchanger. However, the construction is such that the heat of water in the radiator water reservoir is not available for tap water heating. The ability to produce hot tap water upon demand is therefore limited by the heat pump and the electric heating device, so that a large storage capacity for hot tap water is required in order that the heat source for tap water heating shall not be markedly overdimensioned.

The present invention has as its object to provide an apparatus for producing hot tap water that is not encumbered with the above mentioned disadvantages.

According to the invention, this object is achieved if the heating apparatus comprises means defining a radiator circuit having heat radiating means (at least one radiator) and through which radiator water can be circulated, means comprising a heat source for heating radiator water in the radiator circuit, a reservoir connected in the radiator circuit for storage of heated radiator water, and means providing a tap system from which heated tap water can be drawn. The apparatus of this invention is characterized by a heat exchanger having two passages that are in heat exchange relationship with one another, through a first of which radiator water can flow and through the second of which a source of unheated tap water is communicated with the tap system; duct means connected with the reservoir and with said first passage to define a heat exchanger circuit for circulation of radiator water from the reservoir through said first passage and back to the reservoir and whereby said first passage is connected with the reservoir in parallel with the heat radiating means; and radiator water circulating means comprising first pump means in said radiator circuit and second pump means in said heat exchanger circuit for circulating radiator water from the reservoir through each of said circuits substantially independently of circulation through the other, so that hot radiator water in the reservoir can serve as a heat source for heating tap water.

In a practical embodiment the heat source is preferably a heat pump and the heat exchanger is its condenser, and it is also suitable according to the invention that the reservoir has communication with an alternative heat source for heating of radiator water, the alternative heat source being connected with the reservoir in a third circuit that is in parallel with the radiator circuit and the heat exchanger circuit so that the heat produced by that alternative heat source is transferrable to the condenser for heating of tap water. In this way the radiator water can conduct heat from one or the other of the two heat sources or simultaneously from both the heat pump and the alternative heat source, the latter being, as a rule, a conventional oil fired boiler that may already be installed.

The invention is further suitably characterized in that the second pump means, for circulation of radiator water in the heat exchanger circuit, comprises a reversible pump device for circulating radiator water in alternative flow directions through the reservoir and the heat exchanger.

Further advantages are obtained according to the invention if the subject matter of the invention is designed according to the preferred embodiment shown in the accompanying drawings, which diagrammatically illustrate the scheme of connection for a heating plant according to the invention, comprising in part a conventional heating boiler and in part a heat pump. More specifically:

Figure 1:
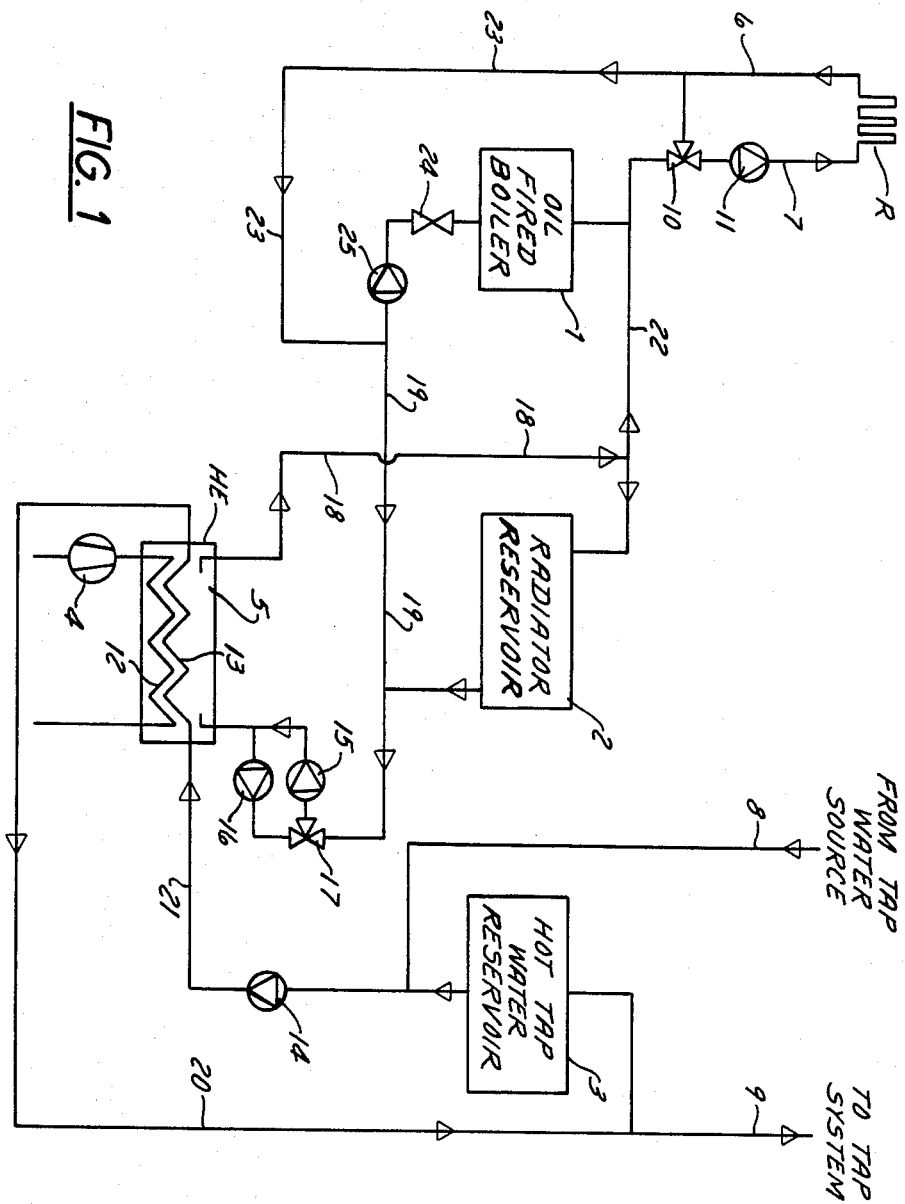
FIG. 1 illustrates the flow pattern in normal operation when the heat pump is operating and serves as the heat source for the apparatus.

In its most general form the invention comprises a heat source 4 (described hereinafter) that gives off its heat by way of a heat exchanger HE with a passage 12 for a heat delivery medium, a passage 5 for radiator water, and a passage 13 for tap water heating. According to the invention, the heat exchanger is so designed that all of its passages 12, 5 and 13 have heat transfer communication with one another. As explained hereinafter, the apparatus can also have a second heat source 1.

The heat exchanger passage 5 for radiator water is communicated with a radiator water reservoir 2 that is also connected in a radiator circuit which comprises at least one radiator R at which heat is given off, a riser 7 for conducting hot radiator water to the radiator, and a return duct 6 for cooled water from the radiator.

The heat exchanger passage 13 for tap water heating communicates a source 8 of unheated tap water with a tap system 9 from which heated tap water can be withdrawn, and that system 9 and the passage 13 are preferably but not necessarily connected with a reservoir tank 3 for heated tap water.

The heat source is often, in practice, a heat pump, and when it is in operation, heat is transferred by way of the heat exchanger HE partly to the radiator system and partly to the hot tap water system. If at any time the consumption of hot tap water and radiator water is less than the produced quantities, the respective reservoirs 3 and 2 will be charged. If on the other hand the consumption of hot tap water and radiator water is greater than the production, the momentary excess requirement is taken from the respective reservoirs.

According to the invention, the hot tap water reservoir 3 can be dimensioned with absolutely minimal volume. This seems to imply that one must risk being completely without hot tap water under certain operating conditions. However, that risk is eliminated, and hot tap water is always produced in sufficient quantities, because according to the invention heat is transferred from the radiator system to the tap water heating system by taking heated radiator water out of the radiator reservoir 2 and conducting it through the heat exchanger passage 5, where it gives off its heat to tap water flowing through the passage 13. Suitably, heat conduction in the heat exchanger HE is accomplished in counterflow, to ensure a suitably high temperature of the heated tap water.

With a suitable dimensioning and design of the heat exchanger HE very large heat transfer capability can be obtained between the two kinds of water, since very large flows can be momentarily taken out of the radiator reservoir 2. It is also possible to transfer heat to the tap water simultaneously from the radiator water and from the heat source, whereby capability for production of hot tap water can in general attain such values that a reservoir for hot tap water, as indicated above, can be wholly dispensed with.

If a second heat source is employed, it can in practice be an oil burner or a solid fuel boiler, which can be operated at significantly higher temperatures than a heat pump. As here illustrated, the second heat source 1 is assumed to be an oil fired boiler. It is connected with the radiator water reservoir 2 in a third circuit which is in parallel with the radiator circuit 6, 7 and with the circuit comprising the heat exchanger passage 5, and it is so connected that it can feed hot radiator water into either the radiator circuit or the reservoir 2 or both of them. Radiator water heated to a very high temperature by the second heat source 1 and stored in the radiator reservoir 2 increases the ability of the apparatus to produce hot tap water, owing to the available high temperature, even if the first heat source (i.e., the heat pump) is temporarily out of operation.

To provide in practice for the transfer of heat from radiator water to the tap water system, the flow of radiator water through the heat exchanger passage 5 is selectably reversible as to its direction, in accordance with existing conditions. Such reversibility of the radiator water flow direction is most simply obtained by means of a three-way valve 17 and two oppositely directed pumps 15, 16, the pump 16 being employed to propel the flow when withdrawal of heat takes place from radiator water to the hot tap water system and the pump 15 being employed to propel the flow when radiator water is to be heated at the first heat source.

In the accompanying drawings, the heat pump that comprises the first heat source is illustrated only by showing its compressor 4 and the compressed refrigerant passage 12 in the heat exchanger HE, which comprises the condenser of the heat pump. For simplicity, other conventionally present elements of the heat pump are not shown.

For regulating the supply of heat in the radiator circuit that comprises the riser duct 7 and the return duct 6, a shunt valve 10 is connected in infeed relation to the riser duct 7 and in shunt relation to the return duct 6, to provide for mixing a certain proportion of cooled radiator water returning in the duct 6 with hot radiator water being conducted to the heat radiating means R through the riser duct 7. Circulation in the radiator circuit is provided for in a conventional manner by means of a circulation pump 11 that is connected in the riser duct 7, upstream from the connection of that duct with the shunt valve 10.

Although the oil fired boiler 1, the reservoir 2 for radiator water, and the reservoir 3 for hot tap water are shown as separate units, it is obvious that they could as well be combined into one unit and included, for example, in the boiler itself. Such an arrangement would be particularly suitable for an installation dimensioned for small heat capacity. On the other hand, the radiator water reservoir 2 could consist, for example, of several individual tanks connected in parallel or in series.

In the preferred embodiment here shown, wherein the heat exchanger HE comprises the condenser of the heat pump that further comprises the compressor 4, the passage 12 for compressed refrigerant and the passage 13 for tap water are defined by respective coils in the heat exchanger envelope, while the passage 5 for radiator water exists because the radiator water in the heat exchanger envelope freely washes around both of the pipe coils that define the passages 12 and 13. In order to achieve good heat transfer between the two passages 12 and 13, they are arranged in metallic contact with one another so that heat transfer from the refrigerant circuit is in part accomplished through a direct conduction of heat through the metal and in part through an indirect heat transfer from the refrigerant circuit by way of the radiator water present in the heat exchanger, and from it to the tap water heating passage 13. Naturally this design of the heat exchanger HE also provides for a very effective heat transfer between the radiator water flowing through it and the tap water flowing in the passage 13.

In order to allow taking out as high a temperature as possible for the tap water at the tap water heating passage 13 in the heat exchanger, tap water and refrigerant in the passage 12 are propelled in counterflow to one another. The flow of tap water through the passage 13 is propelled by a pump 14, and the reservoir 3 for hot tap water is connected in a series circuit with the pump 14 and the tap water passage 13 in the heat exchanger, but that circuit also has a connection with the tap water system whereby hot tap water can be drawn from it.

As brought out above, it is a principal objective of the invention to maintain the reservoir 3 for hot tap water at a minimum size, or wholly eliminate it. The reason for this is very simply that a storage of heated tap water is undesirable, partly on the ground of risk of corrosion and partly on the ground that the tank for such water is under full water system pressure. Although a heat pump must be regarded as an intermittently working heat source during a large part of the time that the apparatus is operating, this circumstance does not imply any reduction of availiability of hot tap water because according to the invention, as pointed out above, a large quantity of heat energy is stored in the radiator reservoir 2, and this heat energy is transferred to the tap water as it is needed. Generally, this is achieved according to the invention because when the heat pump compressor 4 is operating, radiator water is taken from the bottom of the reservoir 2 and is circulated through the heat exchanger passage 5 in counterflow to the hot refrigerant in the passage 12, and, thus heated, it is returned to the top of the reservoir 3. In the radiator reservoir there can thus be stored a large quantity of heated water which is then used during periods when the heat pump compressor 4 is idle. For efficient transfer of the heat content in this stored radiator water to the tap water, the flow direction of radiator water through the radiator reservoir and the heat exchanger passage 5 is simply reversed from what it was during heat pump operation, so that the heated radiator water is taken from the top of the reservoir 2, propelled in counterflow to tap water in the heat exchanger passage 13, and returned to the bottom of the reservoir 2. Because all transfer of heat to the tap water takes place in counterflow, the maximum temperature for the heated tap water is always ensured.

The above mentioned reversal of flow direction through the heat exchanger passage 5 and the radiator reservoir 2 is provided for by means of the two oppositely directed pumps 15 and 16, together with a reversing valve 17 which alternatively directs the radiator water through the one or the other of those pumps. The two pumps 15 and 16 are alternatively operable, so that the pump 16 is idle while the pump 15 is employed for charging the radiator reservoir with heated radiator water and when heat is being taken from the heat pump by way of the radiating means R. On the other hand, the pump 15 is idle and the pump 16 is operating during heat transfer from the radiator reservoir 2 to the tap water.

In order to describe in more detail how the apparatus operates, it is suitable to distinguish certain operating conditions. FIG. 1 illustrates an operating condition which can be regarded as a normal case in that the heat pump comprising the compressor 4 produces the entire quantity of heat that is required for satisfying the total heat requirements, which is to say both the heat requirements for the radiator circuit and the heat requirements for tap water heating. This means that with normal dimensioning standards for the heat pump, it will be in operation through the largest part of the year, except in periods when especially cold weather prevails.

In the operating condition illustrated in FIG. 1, the heat pump compressor 4 is in operation and heat is taken up partly by the radiator circuit 6, R, 7 and partly by the tap water heating system 3, 9. In this case the pump 15 operates, so that radiator water flows from the pump 15 into the heat exchanger passage 5, and out of the latter by way of the duct 18, which has connections both with the upper end of the radiator reservoir 2 and with the shunt valve 10. In case the withdrawal of water through the valve 10 under the influence of the radiator circuit pump 11 is less than the total capacity of the pump 15, a partial flow is caused to pass through the radiator reservoir 2, so that heated water is filled into that reservoir while the cool bottom water in it is returned to the heat exchanger by way of the duct 19 and the pump 15. At the same time, however, the tap water pump 14 acts to force a flow through the tap water heating passage 13 in the heat exchanger, so that heated tap water is sent by way of the duct 20 to the upper end of the tap water reservoir tank 3, while the cool bottom water in that tank is driven back to the heat exchanger by the pump 14 and by way of the duct 21.

Figure 2:
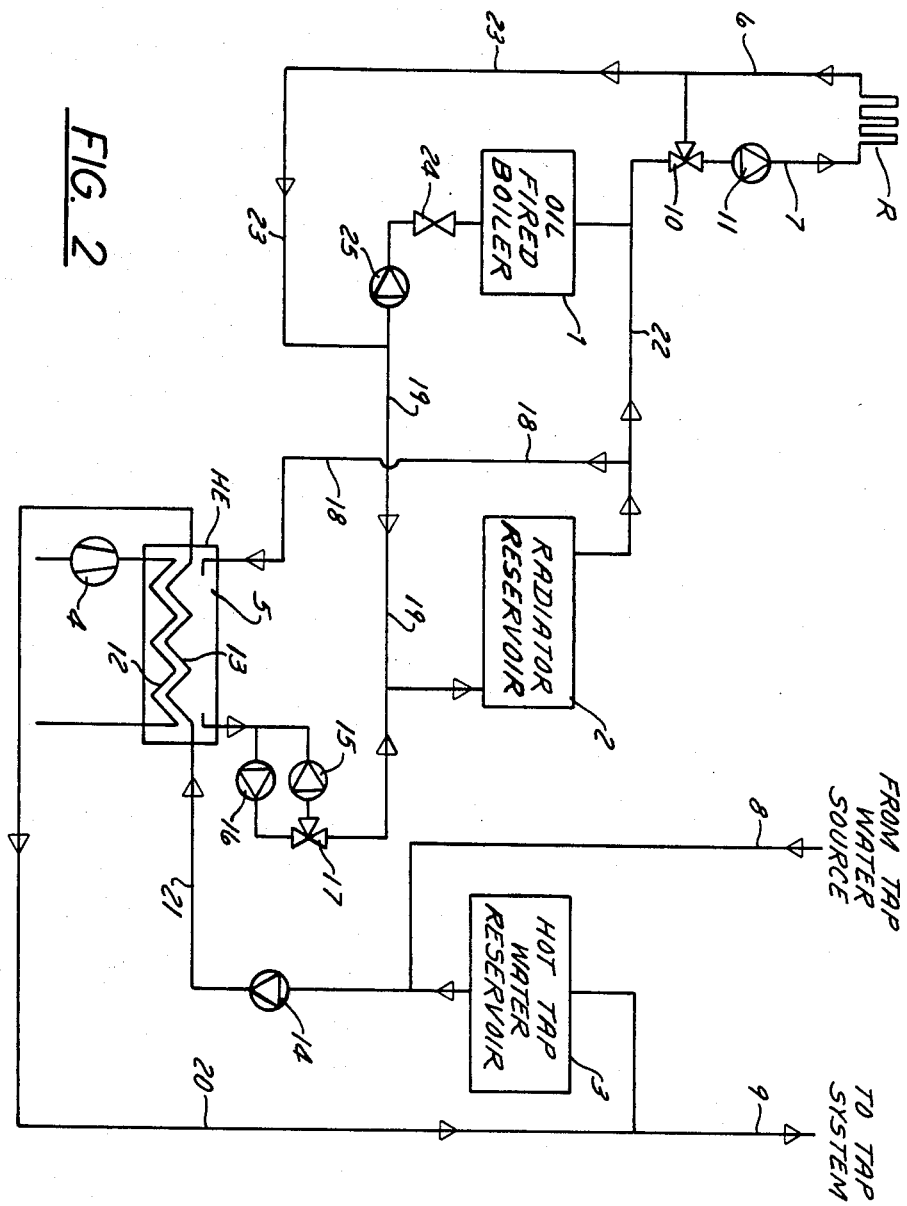
FIG. 2 illustrates the flow pattern in normal operation during a period when the heat pump is idle.

During weather conditions such that the capacity of the heat pump exceeds the heat demanded at the radiator circuit 6, R, 7, the radiator reservoir 2 receives a flow of heated radiator water. When the reservoir 2 is completely filled with heated radiator water, the heat pump compressor 4 is stopped, after which the reservoir 2 functions as a heat source in the system. FIG. 2 illustrates the flow paths when the heat pump is thus idle. In this case hot radiator water is withdrawn from the upper end of the radiator reservoir 2 and is conducted by way of duct 22 to the shunt valve 10 and the radiator circuit pump 11. The cool radiator return which, as previously, comes in by way of the connected ducts 6, 23 and 19, now goes into the lower end of the radiator reservoir 2.

As soon as the quantity of hot tap water in the reservoir 3 decreases to a predetermined limit, or alternatively, as soon as the compressor 4 is stopped, the position of the valve 17 is changed, and simultaneously the pump 15 is stopped and the pump 16 is started. In this manner heated radiator water is caused to flow from the top of the radiator reservoir 2 by way of ducts 22 and 18 to the heat exchanger, where heat is given off to the tap water in the passage 13, whereupon the cooled radiator water returns by way of the duct 19 to the bottom of the radiator reservoir 2. When thereafter—depending upon heat consumption in the heat exchanger circuit and/or the radiator circuit—the heat content in the radiator reservoir 2 decreases to a certain limit, the heat pump compressor 4 is started again, and the operating conditions are converted back to those illustrated in FIG. 1.

With extremely large withdrawal of hot tap water, or if the hot tap water reservoir 3 is totally omitted or is extremely small, it is also possible to operate the pump 16 at the same time that the heat pump compressor 4 is in operation. Through this the capability for instantaneously producing hot tap water in the heat exchanger, as required, can be increased.

In extremely cold weather the capacity of the heat pump is as a rule insufficient, and therefore in that situation heat production can be taken over by the oil fired boiler 1 and the heat pump can be completely stopped until a decreased heat requirement again exists. Such an operating alternative is illustrated in FIG. 3.

In a modified embodiment it is also possible to let the heat pump and the oil fired boiler work side by side. For this a suitable connection is made whereby the heat pump is loaded with the main part of the heat demand, so that it works continuously, while the oil fired boiler is employed for covering the peak load and thus operates intermittently. In this operating case, also, heat can be transferred, as needed, from the radiator system by way of the condenser or a general heat exchanger, to the tap water heating system, and it should be pointed out that in this case the temperature in the radiator reservoir can be expected to be higher than with pure heat pump operation.

Figure 3:
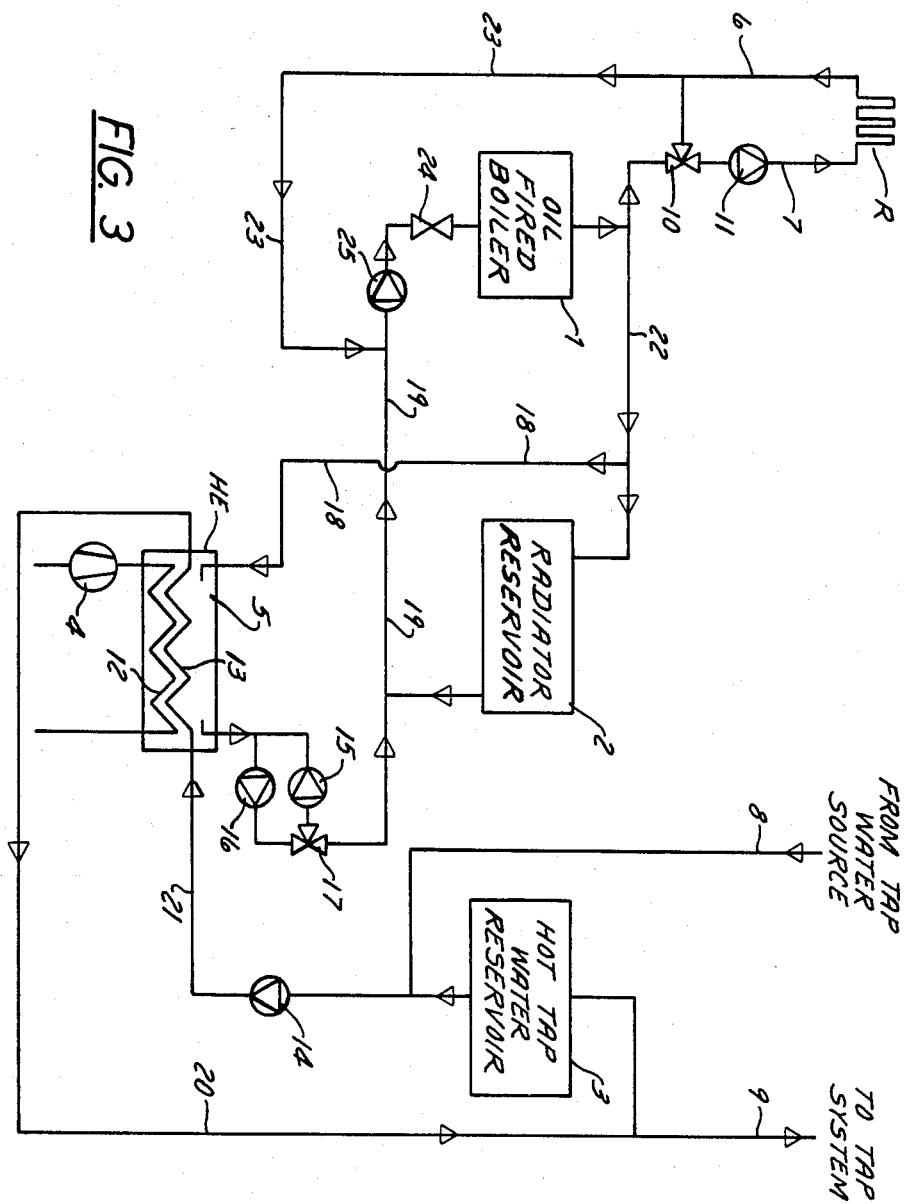
FIG. 3 illustrates the apparatus during winter operation when the conventional heat source in in operation.

In order to permit the mode of operation illustrated in FIG. 3, that is, operation exclusively with the oil fired boiler 1, a valve 24 is opened that controls circulation through the boiler 1, and at the same time a pump 25 is started to propel radiator water through that boiler. Thereupon the radiator water heated in the oil fired boiler 1 passes from that boiler's upper end, partly to the shunt valve 10 and partly by way of the duct 22 to the radiator reservoir 2. At the same time, too, the cooled radiator return water comes in to the oil fired boiler by way of the duct 23 and the pump 25. The water that passes out of the cool lower end of the radiator reservoir 2 flows by way of the duct 19 to the pump 25 and into the oil fired boiler. In that operating condition the oil fired boiler in part gives off heat to the radiator circuit and in part allows storage of heated radiator water in the radiator reservoir 2.

In order to also permit production of hot tap water in the last-described operating condition, the pump 16 is started so that a flow of hot radiator water is conducted from the upper hot end of the oil fired boiler 1, by way of the ducts 22 and 18, to the heat exchanger passage 5, where a heat transfer takes place to the tap water in the passage 13. From the heat exchanger passage 5 the cooled radiator water flows by way of the pump 16 and the duct 19, back to the pump 25 and the oil fired boiler.

Figure 4:
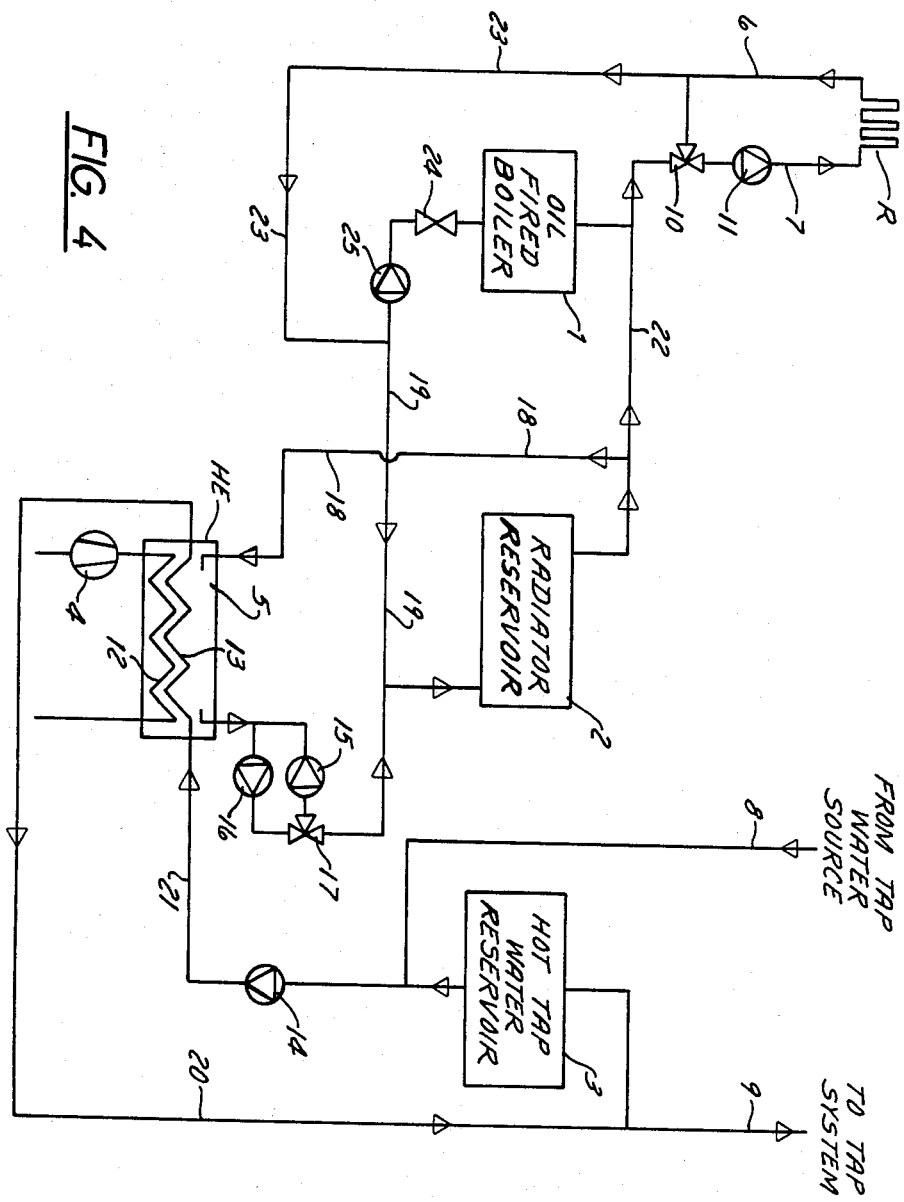
FIG. 4 illustrates the flow pattern during winter operation during a period when the conventional heat source is idle.

When the oil fired boiler 1 has caused the radiator reservoir 2 to be filled to a predetermined limit, which can be indicated by a temperature transmitter, the temporary operation of the oil fired boiler is stopped (see FIG. 4), whereupon at least the pump 25 is stopped and eventually the valve 24 is also closed. Thereupon the cool water from the radiator circuit comes in by way of the duct 23 and transfers therefrom, by way of the duct 19, to the lower cool end of the radiator reservoir 2. Hot radiator water passes out of the upper end of the radiator reservoir by way of the duct 22, partly to the shunt valve 10 and the radiator circuit pump 11 and partly by way of the duct 18 to the heat exchanger passage 5, from which the flow is driven forward by means of the pump 16 through the duct 19 and back to the cold lower end of the radiator reservoir. When later the radiator reservoir 2 is unloaded to a certain predetermined limit, the oil fired boiler 1 is started again and flow conditions return to what is shown in FIG. 3.

The invention can be modified in various ways that will be evident to those skilled in the art. Thus, the apparatus can be simply altered, as indicated above, to provide for parallel operation of the oil fired boiler and the heat pump. Furthermore, the apparatus can comprise one or a plurality of conventional boilers instead of that denoted by reference numeral 1. It is thus entirely possible to arrange an oil fired boiler, an electric boiler and a solid fuel boiler, or a plurality of these boiler types, in parallel with one another. Naturally the heat pump can also be expanded so that it comprises several different units, with, for example plural condensers if the apparatus is arranged for covering large heat demands. It is common to all of these variants, however, that the principal energy storage occurs on the radiator water side and that in all of the operating conditions in which the heat pump in itself cannot transfer sufficient heat to the tap water, heat energy is transferred from the radiator water side to the tap water heating side by way of the heat exchanger that comprises the heat pump condenser.

What is claimed as the invention is:

1. Heating apparatus for supplying heat to heat radiating means at desired times and in desired quantities and for heating tap water from an unheated source thereof for withdrawal at a tap system as hot tap water at desired times and in desired quantities, said heating apparatus comprising a heat pump having a compressor by which refrigerant is compressed and a heat exchanger having a refrigerant passage connected with the compressor and through which compressed refrigerant can flow, said heating apparatus being characterized by:

A. a reservoir for storage of radiator water;
   B. means defining a raditor circuit in which said heat radiating means and said reservoir are connected and in which radiator water can circulate;
   C. means in said heat exchanger defining
      (1) a radiator water passage and
      (2) a tap water passage, each of which is in heat transfer relationship with the other and with said refrigerant passage;
   D. means connecting said radiator water passage with said reservoir in parallel with said heat radiating means and defining a heat transfer circuit wherein radiator water can circulate through the radiator water passage in bypass relation to the heat radiating means;
   E. means communicating the tap water source with the tap system through said tap water passage to provide for heating tap water from both compressed refrigerant and radiator water; and F. radiator water circulation controlling means comprising valve means and pump means arranged to provide for circulation of radiator water from the reservoir through each of said circuits substantially independently of circulation through the other.

2. The heating apparatus of claim 1, further characterized by:

G. means providing a second heat source for heating of radiator water, and

H. duct means
  (a) connected with said reservoir and
  (b) defining a third circuit for radiator water
    (i) which is in parallel with said radiator circuit and with said heat transfer circuit and
    (ii) through which radiator water flows from said reservoir to said second heat source to be heated thereat and thence back to the reservoir.

3. The heating apparatus of claim 1, further characterized by:

G. said refrigerant passage being so connected with the compressor that compressed refrigerant flows therethrough in counterflow to tap water flowing in said tap water passage from said source to the tap water system.

4. The heating apparatus of claim 3, further characterized by: said radiator water circulation controlling means being further arranged to selectably and alternatively circulate radiator water through said radiator water passage
  (1) in the direction counter to the flow of compressed refrigerant in said refrigerant passage, for heating of radiator water, or
  (2) in the direction counter to the flow of tap water in said tap water passage, for transfer of heat from radiator water to tap water.

* * * * *